United States Patent [19]
Jones

[11] 4,383,761
[45] May 17, 1983

[54] SCOPE FOR VIEWING THE INTERNAL SURFACE OF BORES AND SIMILAR CAVITIES

[76] Inventor: Ira D. Jones, 1023 S. Main St., South Bend, Ind. 46601

[21] Appl. No.: 202,142

[22] Filed: Oct. 30, 1980

[51] Int. Cl.³ .............................................. G01N 21/90
[52] U.S. Cl. ..................................... 356/241; 350/96.1
[58] Field of Search ........................... 350/96.10, 96.26; 356/241

[56] References Cited
U.S. PATENT DOCUMENTS 3,413,067  11/1968  Froio .................................... 356/241
3,724,922  4/1973  Jones ................................ 356/241 X

*Primary Examiner*—Paul L. Gensler
*Attorney, Agent, or Firm*—James D. Hall

[57] ABSTRACT

A scope for viewing the internal surface of a bore or similar cavity for use in combination with a light source. The scope includes a rod having an image transmitting end and an image viewing end. Diffusing and reflecting means are located at the rod viewing end and are surrounded by a housing. External light is directed onto the diffusing and reflecting means which in turn directs the light along the length of the rod to its image transmitting end and onto the cavity surface when the scope is inserted into the cavity. The image transmitting end of the rod allows the cavity surface to be viewed.

14 Claims, 7 Drawing Figures

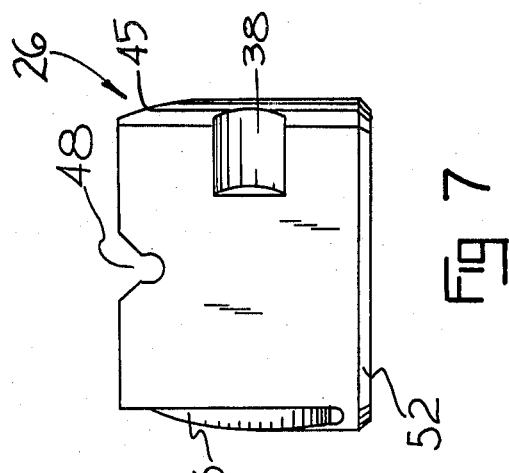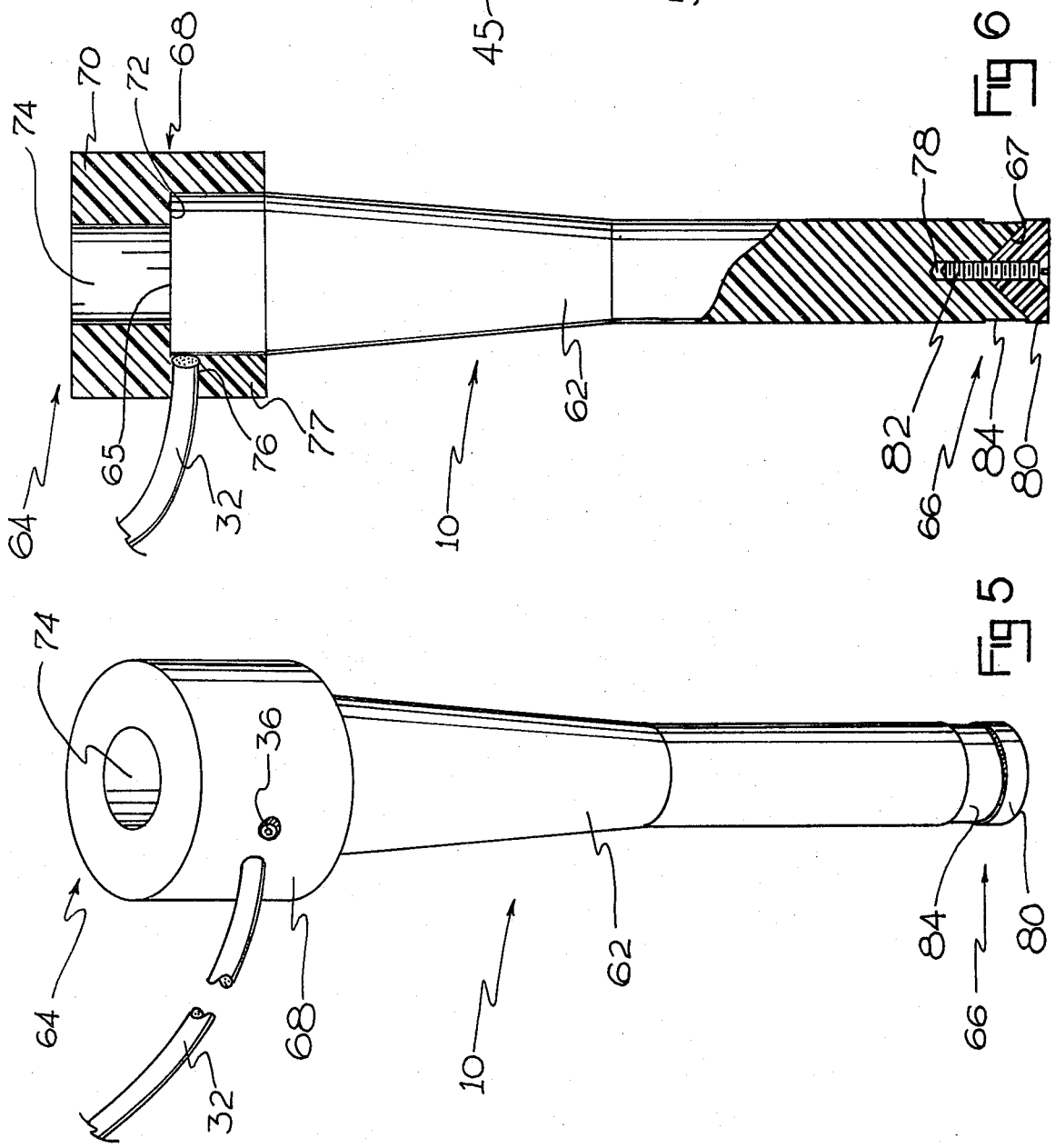

SCOPE FOR VIEWING THE INTERNAL SURFACE OF BORES AND SIMILAR CAVITIES

SUMMARY OF THE INVENTION

This invention relates to a scope for viewing the internal surface of a bore or similar cavity and is designed to be used with an external light source.

The scope consists of a rod made of an optically clear material having a viewing end and an image transmitting end. Light diffusing and reflecting means are disposed at the viewing end of the rod. A housing having an opening in its side wall for admitting light therethrough and directing it onto the diffusing and reflecting means surrounds the diffusing and reflecting means. As a light source directs light into the housing opening, the diffusing and reflecting means directs the light along the length of the rod to the image transmitting end and onto the cavity surface when the rod is inserted into the cavity. The rod image transmitting end serves to reflect the cavity surface image to the viewing end of the rod.

Accordingly, it is an object of this invention to provide a novel scope for observing the internal surface of a bore or similar cavity.

Another object of this invention is to provide a simple and economical scope for viewing the internal surface of a bore or similar cavity.

It is another object of this invention to provide a scope which is for viewing the internal surface of a bore or similar cavity and which includes diffusing and reflecting means at the viewing end of the rod which direct and diffuse light along the length of the rod.

Another object of this invention is to provide a scope of simplified and economical design which is for use in connection with a single light source and which eliminates glare and bright spots normally present in the use of single light sources with scopes of this type.

Other objects of this invention will become apparent upon a reading of the following description of the invention.

BRIEF DESCRIPTION OF THE DRAWINGS

FIG. 5 is a perspective view of a second embodiment of the scope of this invention.

FIG. 6 is a longitudinal sectional view of the scope of FIG. 5.

FIG. 7 is a front elevational view of the diffuser ring of FIG. 4.

DESCRIPTION OF THE PREFERRED EMBODIMENTS

The preferred embodiments illustrated are not intended to be exhaustive or to limit the invention to the precise forms disclosed. They are chosen and described in order to explain the principles of the invention and its application and practical use to thereby enable others skilled in the art to best utilize the invention.

Figure 1:
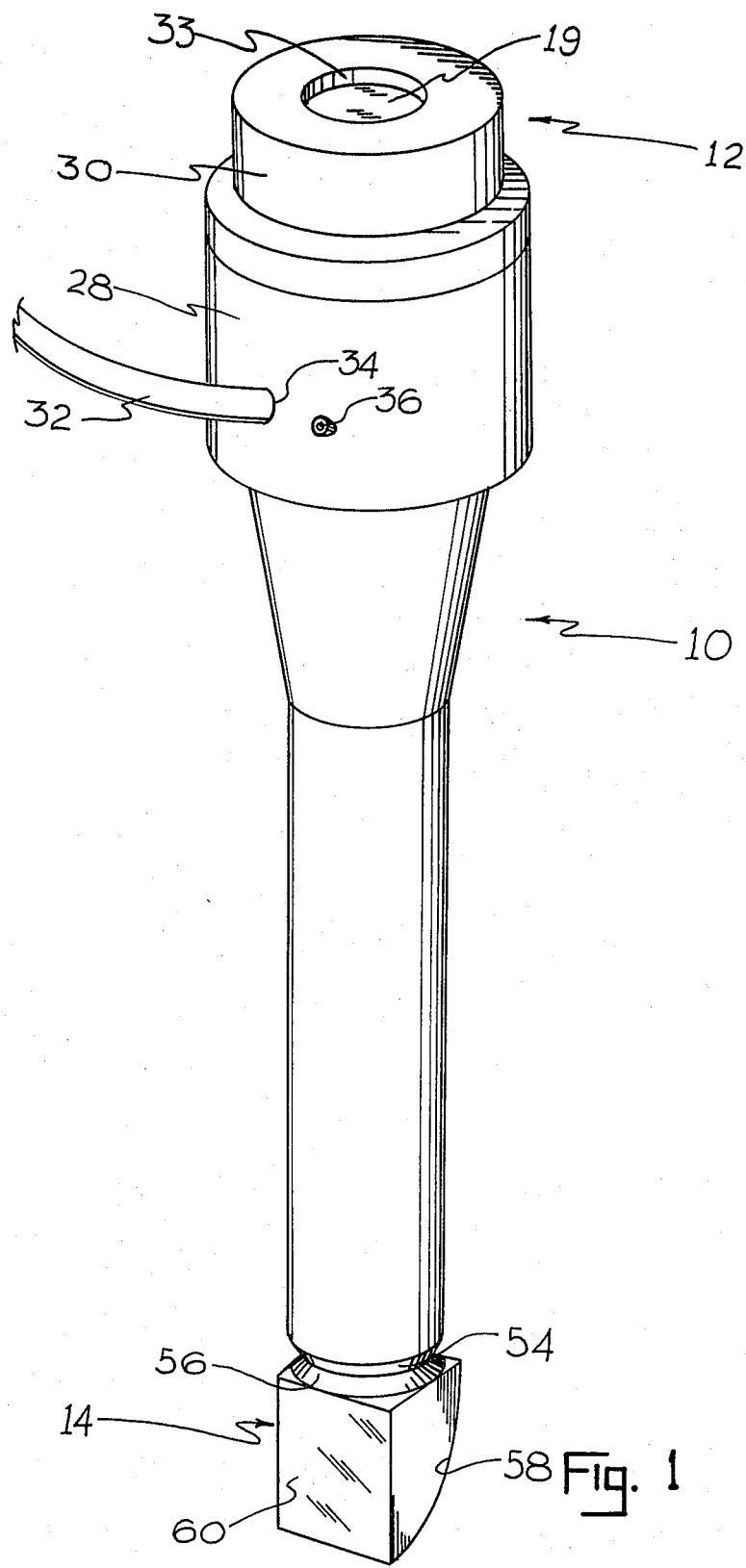
FIG. 1 is a perspective view of one embodiment of the scope of this invention.
Figure 2:
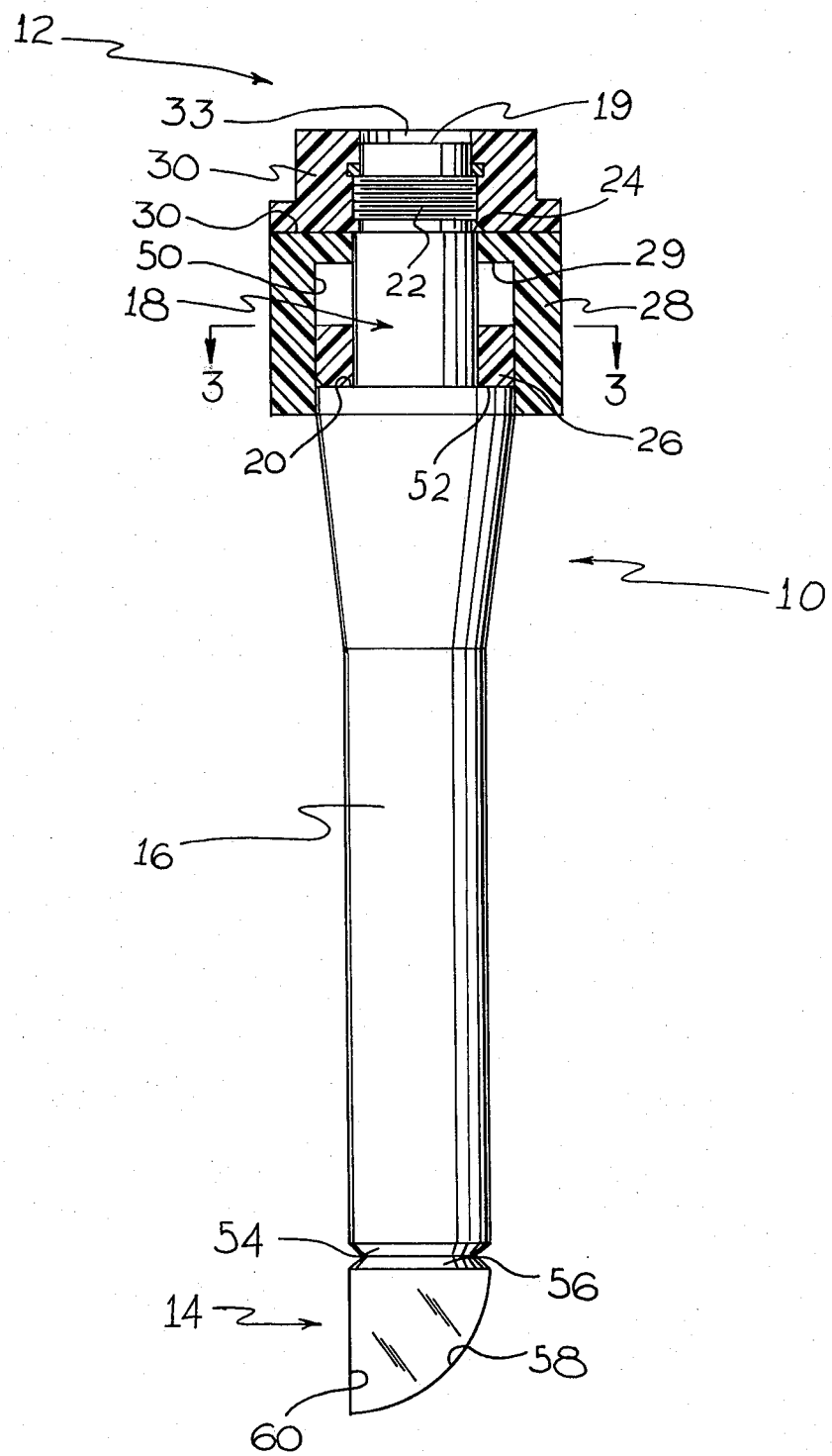
FIG. 2 is a longitudinal sectional view of a scope of this invention taken along line 2—2 of FIG. 3.
Figure 4:
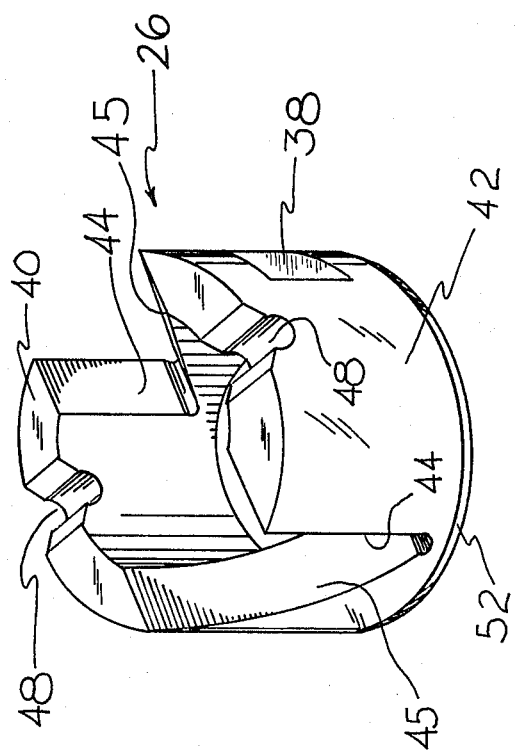
FIG. 4 is a perspective view of the diffuser ring of the scope embodiment of FIG. 1.
Figure 3:
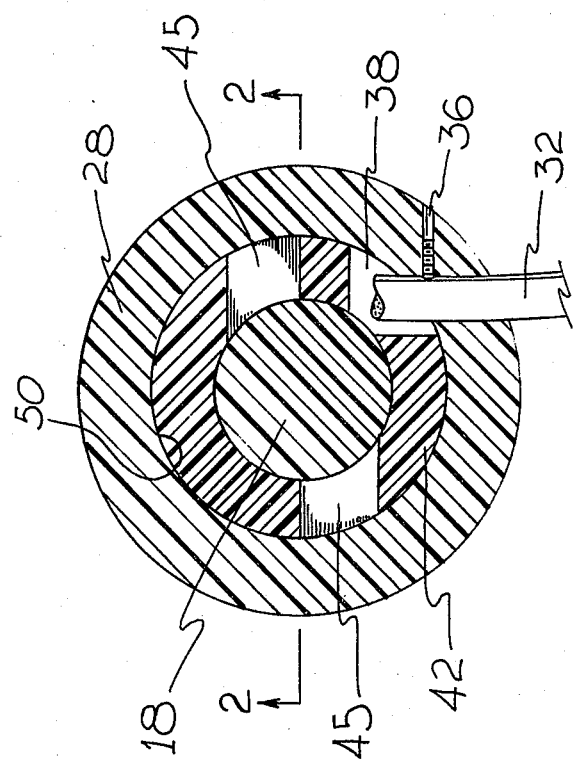
FIG. 3 is a cross sectional view taken along line 3—3 of FIG. 2.

FIGS. 1–4 illustrate one embodiment 10 of the scope for viewing the internal surface of a bore. Scope 10 includes a rod 16 which has a viewing end 12 and an image transmitting end 14. Rod 16 is made of optically clear material such as acrylic resin and transmits and directs light between viewing end 12 and image transmitting end 14. A neck 18 is formed at the upper end of rod 16 having a diminished diameter to form a should 20. Neck 18 is further diminished in diameter at a threaded portion 22 to form a second shoulder 24. Neck 18 is formed coaxially on rod 16 with its upper end face 19 forming a part of viewing end 12. An annular diffusing and reflecting ring 26, also made of optically clear material, fits over neck 18 and rests at its bottom edge on shoulder 20. Ring 26 is formed with an outer diameter equal to that of the outer diameter of rod 16 at shoulder 20 and an inner diameter sufficiently large enough to contact neck 18 in a slip or rotative fit. A housing 28 fits around ring 26 in a slip or rotative fit. The top edge 31 of housing 28 is coplanar with shoulder 24. Cap 30 has an opening 33 in its top to permit viewing of rod end face 19. Cap 30 is threaded onto rod neck portion 22 and abuts shoulder 24 of the rod. With inner face 29 of housing 28 resting upon upper end face 40 of ring 26, housing top edge 31 is recessed slightly below the level of rod shoulder 24 and cap 30 to allow rotation of the connected cap and rod 16 relative to ring 26 and housing 28. Housing 28 and cap 30 are preferably made of high impact plastic or similar material.

Housing 28 is adapted to receive a fiber optic cable 32 or other collimated light source. Fiber optic cable 32 extends through an opening 34 through the side of housing 28 and is held there in place by a set screw 36 or other appropriate means. The end of fiber optic cable 32 projects into a side wall opening 38 in diffuser ring 26.

When fiber optic light source 32 is energized, the various configurations in the side wall of ring 26 diffuse and reflect the light in an evenly distributed pattern along the length of rod 16 toward image transmitting end 14. The upper end face 40 and side wall 42 of ring 26 are polished to reflect light downwardly and within the body of ring 26. Two pair of planar diffusing surfaces 44, 45, each forming a deep notch, are formed opposite each other in ring side wall 42. Surfaces 44 are parallel to the longitudinal axial plane of ring 26 and serve to reflect and diffuse light throughout ring side wall 42. Surfaces 45 are at an angle to the longitudinal axial plane of ring 26 and serve principally to diffuse light throughout ring side wall 42 and also to reflect some of the light downwardly toward image transmitting end 14. The degree to which surfaces 44, 45 diffuse the light depends upon the degree to which they are polished. A more polished surface 44 or 45 will produce less diffusion. The greater the angle of surfaces 45 relative to the longitudinal axial plane the greater the amount of light that is reflected downwardly toward image transmitting end 14.

V-shaped indentations 48 descending from ring upper end face 40 and terminating in a curved shape are formed oppositely in the diameter of end face 40, each adjacent to a surface 44. Indentations 48 are polished to reflectively distribute the light in an even array throughout ring 26. By polishing the internal surface 50 of housing 28, light that would normally escape ring 26 will be recovered and reflected into the ring. The peripheral edge of bottom end face 52 of ring 26 is tapered inwardly to serve as a refracting surface to direct light downwardly toward image transmitting end 14. A pair of frusto conical surfaces 54, 56 are formed in rod 16 adjacent its image transmitting end 14. An optical surface 58 is placed at an angle such that light passing through rod 16 is directed onto it for reflection to a second optical surface 60 and onto a chosen cavity wall. Optical surface 60 is parallel to the axis of rod 16. Optical surface 58 may be arcuate, as shown, or it may be flat. Surfaces 54, 56 serve to direct light at the outer periphery of rod 16 into the center of the rod.

A second embodiment of borescope 10 of this invention is shown in FIGS. 5 and 6. The rod 62 is of a construction substantially similar to rod 16 of the first embodiment, having a viewing end 64 and an image transmitting end 66. A housing 68 surrounds the upper end of rod 62 and has a thickened end wall 70 forming a shoulder 72 which rests upon rod end face 65. An opening 74 is formed in upper end wall 70 of housing 68 to permit viewing of rod end face 65. Housing 68 has an opening 76 through its side wall 77 adjacent shoulder 72, into which a fiber optic cable 32 or other collimated light source is inserted to illuminate viewing end 64. Cable 32 is retained in place by a set screw 36 or similar means. The upper end portion of rod 62 enclosed by housing 68 is etched in a rough finish to diffuse the light received from fiber optic cable 32 so that it is evenly transmitted through the length of rod 62 to its image transmitting end 66. Image transmitting end 66 includes a conical indentation 67 formed in the lower end face of rod 62. An image transmitting end of this configuration yields a 360° view of a cavity wall. An internally threaded opening 78 is formed in rod 62 at the apex of indentation 67 and along the axis of rod 62. A cap 80 having a substantially conical shape fits within the indentation 67 to protect the end of rod 62 from damage during usage. A screw 82 fits through the center of cap 80 and is threaded into opening 78 to hold cap 80 in place. The outer surface 84 of rod 16 about identation 67 is relieved to protect the surface from being scratched or marred during usage.

It is to be understood that the above described invention is not to be limited to the details above given, but may be modified within the scope of the appended claims.

What I claim is:

1. A scope for viewing the internal surface of a bore or similar cavity for use in combination with a light source comprising a light transmitting rod having an axis and including an image transmitting end and an image viewing end, light diffusing and reflecting means located at said rod viewing end, a housing having an annular side wall surrounding said diffusing and reflecting means and a bore in said side wall adjacent said diffusing and reflecting means, said housing bore extending through said housing side wall for directing light from said light source into said diffusing and reflecting means, said diffusing and reflecting means for directing said light from said light source along said rod axis towards said rod image transmitting end when said light source is inserted into said housing side wall bore, said rod image transmitting end for reflecting said light onto said cavity surface and for reflecting an image of said cavity surface along said rod axis toward said rod viewing end, said rod having a neck formed at the upper end thereof, said neck having an upper end face, said neck being of smaller diameter than said rod to form a shoulder in the rod, said diffusing and reflecting means constituting an optically clear ring, said ring including an annular side wall having an upper end face and a lower end face, light diffusing and reflecting surfaces formed in said ring side wall, said ring rotatably mounted on said rod neck within said housing with its said lower end face abutting said rod shoulder, said ring side wall having an opening therein which is aligned with said housing side wall bore, said ring side wall opening for receiving the light from said light source, said diffusing and reflecting surfaces for transmitting light along said rod towards its said image transmitting end, said neck upper end face forming an optical surface for viewing an image of said cavity surface, whereby said cavity surface is viewable at said viewing end when said rod is inserted into said cavity.

2. The scope of claim 1 wherein said ring diffusing and reflecting surfaces constitute a generally V-shaped indentation of two converging surfaces in said ring side wall upper end face.

3. The scope of claim 2 wherein one of said converging surfaces is at an angle with the longitudinal axis of said ring.

4. The scope of claim 2 wherein the point of convergence of said converging surfaces is of a rounded shape.

5. The scope of claim 2 wherein said identation extends from said ring side wall upper end face to a depth below said ring side wall opening.

6. The scope of claim 2 wherein said ring has a second said indentation, said second indentation being angularly spaced about said ring side wall from said first mentioned indentation.

7. The scope of claim 6 wherein one of the converging surfaces of said second indentation is at an angle with the longitudinal axis of said ring.

8. The scope of claim 6 wherein the point of convergence of said converging surfaces of the second indentation is of a rounded shape.

9. The scope of claim 6 wherein said second indentation extends from said ring side wall upper end face to a depth below said ring side wall opening.

10. The scope of claim 6 wherein said ring diffusing and reflecting surfaces constitute a plurality of angularly spaced third generally V-shpaed indentations in said ring side wall upper end face, said third indentations extending from said ring side wall upper end face to a depth above said ring side wall opening.

11. The scope of claim 1 wherein said housing is rotatable with said ring relative to said rod neck.

12. The scope of claim 11 wherein a portion of said rod neck protrudes above said housing side wall and ring, means engaging said rod neck portion to retain said ring about said rod neck and within said housing.

13. The scope of claim 12 wherein said ring retainer means constitutes a cap having a central bore therethrough, said cap secured about said rod neck portion with said neck upper end face being viewable through said cap bore to permit viewing of said cavity surface.

14. The scope of claim 13 wherein said cap is rotatable with said rod relative to said housing and ring.

* * * * *